United States Patent Office 3,077,387
Patented Feb. 12, 1963

3,077,387
USE OF WATER-SOLUBLE CHROMATE IONS IN TRACING THE FLOW OF WATER
John L. Boyd, Tulsa, Okla., assignor, by mesne assignments, to Sinclair Research, Inc., New York, N.Y., a corporation of Delaware
No Drawing. Filed May 21, 1959, Ser. No. 814,677
7 Claims. (Cl. 23—230)

This invention relates to a method for analyzing the flow of water and is particularly concerned with a method employing chromate ions for tracing the flow of water in subterranean areas. Methods for tracing flow of water in subterranean areas are highly desirable in the oil well treating field and especially in tracing water flooding operations, e.g. driving water through an oil-bearing formation as from an input to an output well for the purpose of enhancing oil recovery from the output well.

In accordance with the method of the present invention for tracing the flow of water in subterranean areas, dichromate or chromate ions are provided in water at an origin point, portions of water are obtained at a recovery point and the portions are analyzed for chromate ion content as an indication of water derivation or flow from the origin point. Chromate ions can be provided through the addition of water-soluble, chromate ion-yielding compounds to the water at the origin point. Although many seemingly obvious compounds have been tested in methods of this type for this purpose, they have been found unsatisfactory. This points to the empirical nature of the art in general. For instance, among the characteristics of a compound determinative of its suitability in methods of this type is its absorption characteristics in, for instance, sandstone, shale and limestone formations; its water-solubility characteristics; and its detection characteristics when employed in water at low concentrations.

The chromate ion-yielding compounds employed in the method of the present invention which have been found to be only insignificantly, if at all, absorbed by the formation, can be inorganic as well as oil-insoluble, and include for instance $NH_4$ and alkaline metal, e.g. alkali metal, such as sodium, and alkaline earth metal dichromates or soluble alkaline metal chromate, e.g. sodium chromate. In water containing the alkaline earth metals barium or calcium, the precipitation of barium or calcium chromate salts may be avoided by the addition of citric acid in amounts equal to the tracer salt without interfering with the detection of the chromate ion. Sodium dichromate is preferred since it is readily detected by methods useable by unskilled labor and soluble in water and insoluble in oil. Moreover, sodium dichromate is usually used in preference to sodium chromate which is more costly, and is less soluble in water than sodium dichromate. The soluble dichromates will yield chromate ions in acid or neutral solutions or in any event under the acidic conditions existing in most subterranean formations.

The water-soluble, chromate ion-yielding compound is employed, preferably in acidic or neutral solutions, in amounts sufficient to enable detection of the chromate ion at the recovery point, for instance the solution may contain as much as 5% or more of the compound. It can be employed in amounts generally up to the limit of its solubility in the well or formation liquids and preferably from about 1 to 200 p.p.m. to provide water at the output well with a chromate ion content generally greater than about 0.1 p.p.m. (parts per million), advantageously greater than about 0.5 p.p.m. to insure detection by visual means. The upper limit of the amount of the chromate, e.g. sodium dichromate, added to the water is dependent upon the water solubility of the particular chromate ion-yielding compounds selected, e.g. 630 lbs. sodium dichromate per barrel of water. Obviously, however, economic factors dictate the use of minimum quantities.

The analysis for the presence of chromate ions, provided by a chromate ion-yielding compound, e.g. sodium dichromate, in water obtained at the recovery point can be accomplished by adding 5 cc. of a 50% solution of HCl to 50 cc. of sample plus 3 drops of a diphenyl carbazide solution (0.2 g. of diphenyl carbazide in 5 ml. of glacial acetic acid diluted to 20 ml. with ethyl alcohol). If chromate ions are present, indicating flow of water from the origin point, a purple or pink or red-colored solution is produced. A colorimetric, photoelectric cell can be used to detect colors particularly if the chromate ions are present in the water in an amount less than 0.5 p.p.m. However, I prefer to employ a quantity of chromate ion-yielding compound sufficient to provide water at the recovery point with a chromate ion content to enable detection by visual means.

The following specific example will serve to illustrate the present invention but is not to be considered limiting.

*Example I*

A glass test colum 8 feet long and 1 inch in diameter was filled with a crushed Bartlesville sandstone formation pre-saturated with 13,450 p.p.m. NaCl. Water at a rate of 5 cc./min. for 24 hours and containing 9,680 p.p.m. of NaCl and 2.0 p.p.m. of the chromate ion as $CrO_4$ provided by sodium dichromate was passed through the sandstone formation. At intervals of from 2 to 24 hours, the samples of water that passed through the sandstone formation were tested and showed no appreciable loss in the NaCl (e.g. 9,550–9,600 p.p.m.) and $CrO_4$ (e.g. 1.4–1.5 p.p.m. $CrO_4$) content.

*Example II*

In a field test 200 gals. of water in a 4-hour period containing 100 pounds of sodium dichromate are charged into an input well to flood an oil-bearing sand formation. 50 cc. samples of water are taken from each of 2 output wells, A and B, located 330 ft. from each other and at a radial distance of 160 ft. from the input well. The samples were labelled $a$ and $b$ to correspond to the output well from which each was taken. 5 cc. of a 50% HCl solution plus 3 drops of the diphenyl carbazide solution were added to each of the samples with the following results:

| Sample: | Visual color detection of resulting solution |
|---|---|
| a | Red. |
| b | None. |

The above data indicates flow of water in the subterranean sand formation from the input well to output well A but not to output well B.

A wide variety of applications for the method of the present invention will be apparent from the above description such as for instance, tracing the possible contamination of water in water wells and determining the rate of flow of liquid from one well to another.

I claim:
1. A method for tracing the flow of water in subterranean areas including adding a water-soluble chromate ion-yielding compound to the water at an origin point in amounts sufficient to enable detection of the chromate ion at the recovery point, recovering a portion of water at a recovery point, and analyzing the portion for chromate ion content as an indication of water derivation from the origin point.
2. A method for tracing the flow of water through a subterranean oil-bearing sand formation from an input well to an output well, the steps comprising adding a water-soluble inorganic chromate ion-yielding compound to the water at the input well in amounts sufficient to enable detection of the chromate ion at the output well, recovering a portion of water at the output well, and analyzing the portion for chromate ion content as an indication of water derivation from the input well.

3. The method of claim 2 wherein the compound is an alkaline metal chromate and is employed in the water at the input well in amounts from about 1 to 200 p.p.m. to provide the water at the output well with a chromate ion content greater than about 0.1 p.p.m.

4. The method of claim 2 wherein the chromate ion-yielding compound is alkali metal chromate and the analyzing is conducted by adding an acidic solution containing a diphenyl carbazide solution to the portion to produce an identifying color.

5. The method of claim 4 wherein the alkali metal chromate is sodium dichromate.

6. The method of claim 3 wherein the chromate ion-yielding compound is alkali metal chromate.

7. The method of claim 6 wherein the alkali metal chromate is sodium dichromate.

References Cited in the file of this patent

UNITED STATES PATENTS

| | | |
|---|---|---|
| 2,553,900 | Doan | May 22, 1951 |
| 2,578,500 | Bernard | Dec. 11, 1951 |
| 2,868,625 | Frank | Jan. 13, 1959 |

OTHER REFERENCES

Horner: Oil Weekly (1935), pages 29, 30 and 71, July 1, 1935.

Dean: Anal. Chem., vol. 30, pages 977 to 979, May 1958.